Patented Mar. 1, 1932

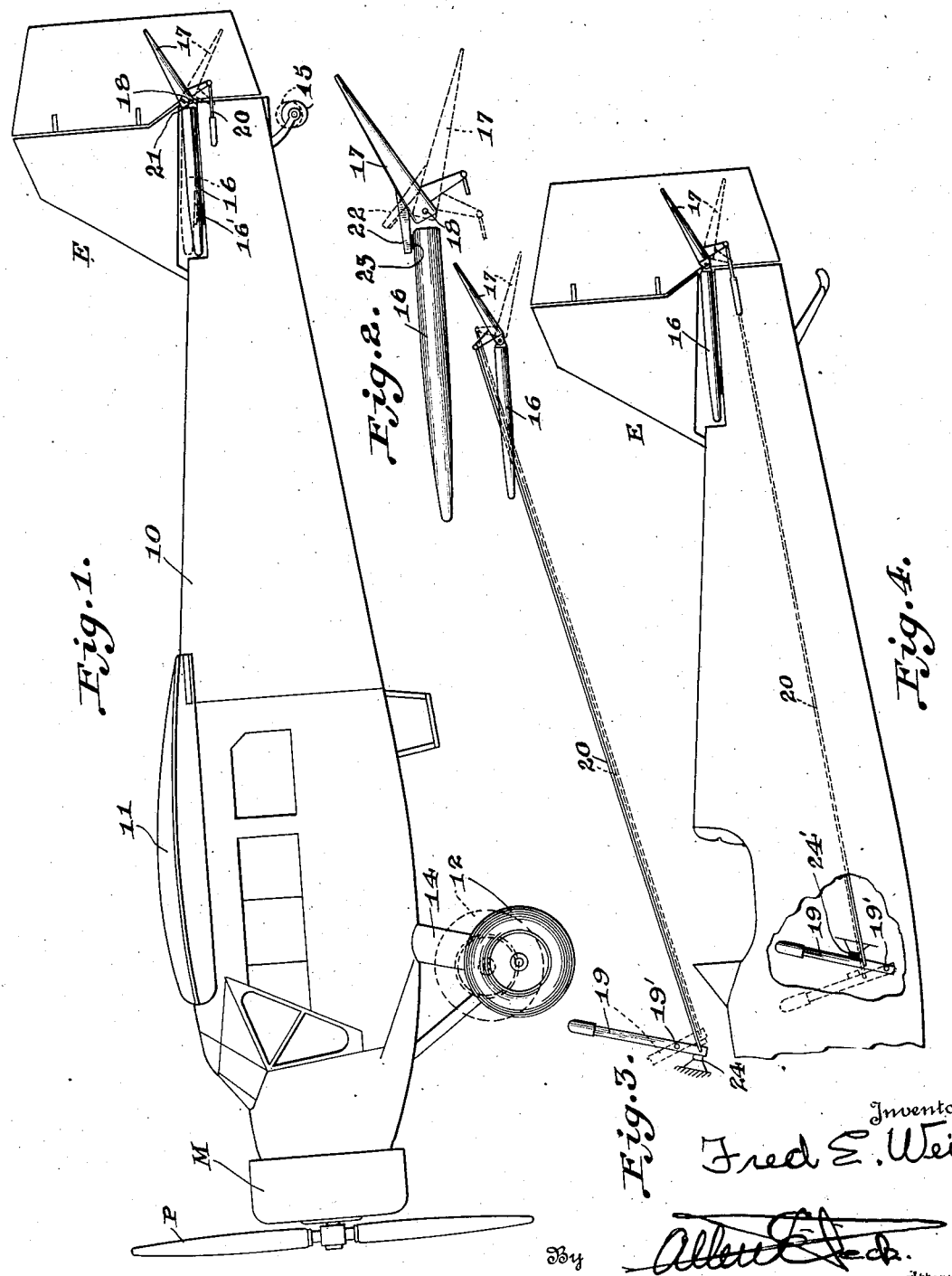

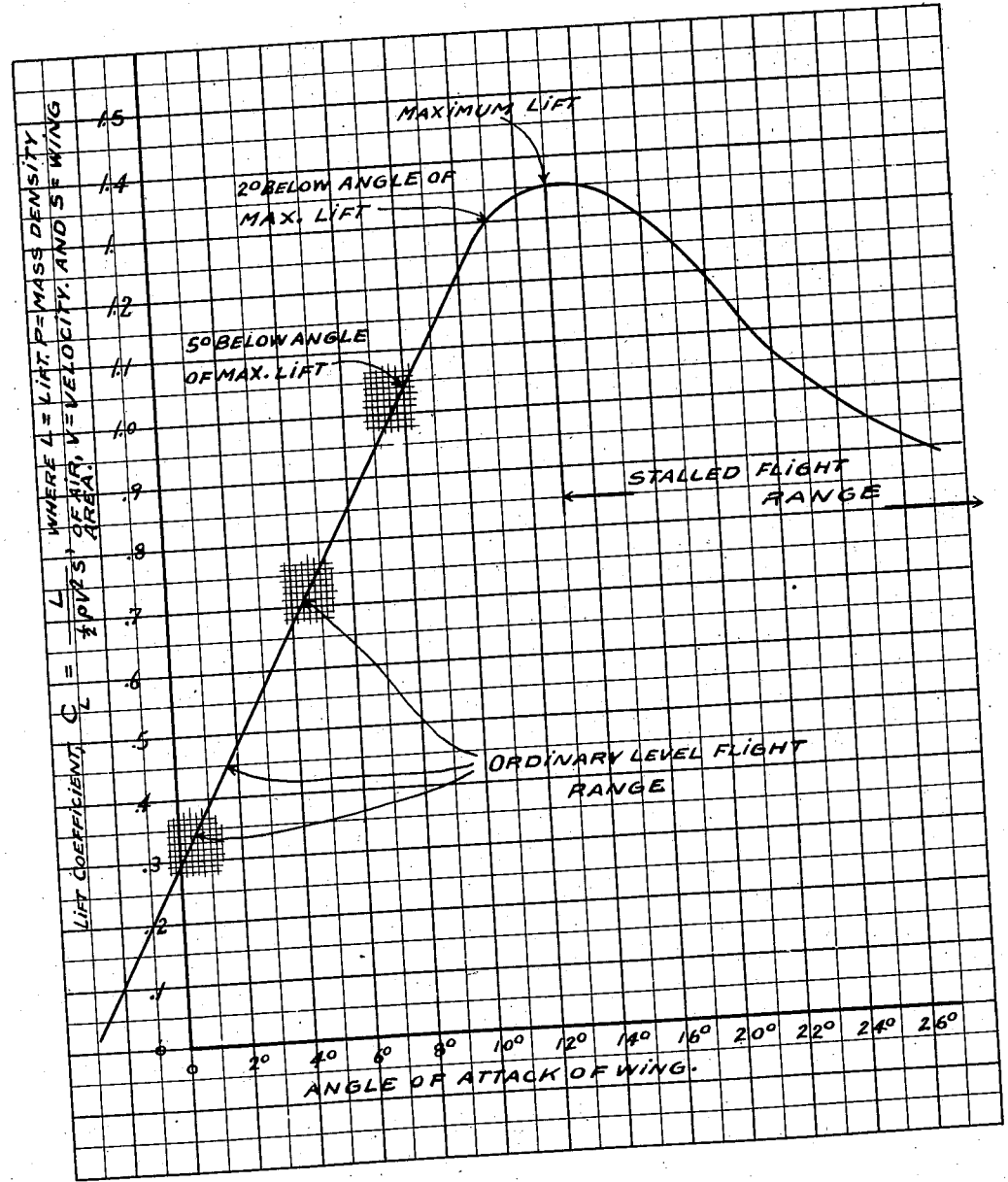

1,848,037

UNITED STATES PATENT OFFICE

FRED E. WEICK, OF HAMPTON, VIRGINIA

AIRPLANE

Application filed February 16, 1931. Serial No. 516,233.

This invention relates to certain improvements in airplanes; and the nature and objects of the invention will be readily recognized and understood by those skilled in the aeronautical art in the light of the following explanation and detailed description of the accompanying drawings illustrating what I at present consider to be the preferred embodiments or aerodynamical expressions, and arrangements for carrying out the method, of my invention from among various other forms, embodiments, combinations and constructions, and from among other steps of the method, of which the invention is capable within the spirit and the scope thereof.

The problems for which my present invention provides a solution, arise out of the difficulties, disadvantages, and hazards encountered in the operation or maneuver of landing airplanes of the conventional types at present in general and universally accepted operation and use; these difficulties, disadvantages, and hazards being inherent in the design and control arrangements of the type.

Airplanes of this general type (the term "airplane" is used herein and in the appended claims in a broad, generic sense to include heavier-than-air craft of both the land and water types, and combinations of such types) are landed by gliding into the landing surface at an airspeed well above the minimum or stalling speed of the particular airplane being landed, usually from 10 to 20 miles per hour above the stalling speed, and then levelling off a short distance above the landing surface and permitting the airplane in its levelled off attitude to gradually settle onto the landing surface as flying speed and sustaining wing lift are lost. The foregoing method of landing presents the decided disadvantage of relatively high speed for the airplane for a considerable period of time close to the landing surface, so that a relatively great distance is required for the airplane to get onto the landing surface and come to complete rest thereon, particularly where, as is usually the case, it is necessary to glide the airplane over objects bordering the landing surface.

Practically every landing field has obstacles adjacent thereto such as trees, buildings, electric wires or such like, which make it incumbent upon the pilot to keep an airplane in landing thereover at an altitude of at least fifty feet at the edge or border of the field. From actual tests made with various typical conventional airplanes all equipped with landing wheel brakes and flown by highly skilled pilots under ideal conditions, it has been demonstrated that when landed over a fifty (50) foot obstruction with no appreciable clearance between airplane and obstruction and making the shortest landing possible with full use of the wheel brakes, a distance ranging from eight hundred (800) feet to fourteen hundred (1400) feet was required. The shorter distance was required for the lightly loaded airplanes tested, and the longer distance for the airplanes of a heavier loading. Normal so-called "three point" landings under the above conditions required approximately fifty percent (50%) more distance than the foregoing "shortest" landings, while the short landings called for and required a much higher degree of skill from the pilot, as the airplane must be flown at as low a speed as possible, and is therefore in constant danger of stalling and falling into a spin if not handled skillfully by the pilot.

The foregoing landing distance requirements are not necessarily unsatisfactory for normal landings under normal flight conditions on large and well maintained airports. These landing requirements and conditions are, however, not only unsatisfactory but are a serious difficulty and hazard under conditions of forced landings in average country where it is necessary to locate and land on, usually without warning, an emergency space which will generally be relatively small, of rough surface and surrounded by obstacles and obstructions which must be cleared to make a landing.

The conventional airplane presents the inherent disadvantage and hazard, especially in attempts to make the shortest possible landing therewith as under conditions of a forced landing, that if the pilot attempts to stretch his glide, as by pulling the control stick too far back to lower the tail and increase the angle of attack of the airplane, a stall may result with the airplane starting into a spin and crashing. Another serious difficulty with the conventional types of airplanes, is the high degree of skill required from the pilot together with excellent eyesight and a highly developed sense of depth perception, in order to flatten out from the landing glide at just the exact distance above the landing surface so as to settle thereonto and make a proper landing with a minimum degree of danger to the airplane or its occupants. Thus, with the typical conventional airplane a forced landing is a dangerous maneuver, particularly with an inexperienced or unskillful pilot, primarily due to the size of the landing space required; the high skill required of the pilot; and the tendency of such types of airplane to be unstable at high angles of attack; while in a less hazardous sense all of the foregoing conditions are serious difficulties and dangerous disadvantages even in landing under normal conditions on normal or large area landing surfaces.

The invention is therefore directed to the elimination of, or substantial reduction in, the foregoing inherent difficulties, disadvantages and hazards of the conventional types of airplane, and is generally characterized by the production of a design and control arrangement through the medium of which such airplanes can be satisfactorily and safely landed in greatly reduced landing areas over those previously required, thereby making available large numbers of small landing areas heretofore impossible of practical safe use by airplanes; by which the step of "leveling-off" in the landing maneuver or operation heretofore essential, is eliminated and the skill required from, as well as the necessary highly developed sense of depth perception of, the pilot is materially reduced and practically eliminated; and especially by which the possibility of stalling the airplane through unskilled or careless piloting, particularly in the landing maneuver, with resulting loss of control followed by a spin, is eliminated.

A feature of my invention resides in the design and arrangement of a conventional type of airplane, including the control system and arrangement and the landing gear thereof, by which the foregoing characteristics and results can be obtained with a minimum of added structure and without major redesigning, reconstruction or change of the conventional airplane design and construction, such minor redesigning and changes capable of being carried out at a minimum of expense and time in airplanes in use, or embodied in an airplane during construction thereof.

The invention is further featured by the provision of certain steps and operations forming a novel method and maneuver in the art of landing an airplane of the generically conventional types, so as to eliminate the heretofore encountered hazards of the conventional landing operation and obtain the safe and highly desirable results hereinbefore outlined.

In its primary and fundamental features dealing with the landing maneuver, the invention is directed to powered airplanes in which as usual, the power is cut or reduced for the landing, and the foregoing characteristics of the invention, especially the inability to stall and spin in the landing maneuver contemplate the power-off condition. The invention however presents and includes as a further feature thereof a design of an airplane of the conventional type in which the arrangement and balancing of forces therein is such as to produce an airplane which is incapable of spinning with power on, yet which retains the desired characteristics of the invention in the power-off condition during the landing operation and maneuver in accordance with the method of the invention.

With the foregoing characteristics, objects and results in view, as well as certain others which will be apparent from the following description, the invention consists in certain novel features in design, arrangement and relative cooperation and combinations of elements, and in certain steps making up the method, as will be more fully and particularly referred to and specified hereinafter.

Referring to the accompanying drawings:

Fig. 1 is a view in side elevation, more or less diagrammatical, of and typifying the conventional airplane, showing the longitudinal control surfaces designed and arranged in accordance with and embodying the invention.

Fig. 2 is a view in end elevation, more or less diagrammatical, of a modified design and arrangement of the longitudinal control surfaces of the airplane of Fig. 1.

Fig. 3 is a more or less diagrammatical view of another form and arrangement of longitudinal control embodying the invention, showing the control stick and elevator actuated thereby.

Fig. 4 is a view in side elevation, more or less diagrammatical, of a type of conventional airplane having another form and arrangement of longitudinal control embodying the invention.

Fig. 5 is a view graphically disclosing the wing lift curve corresponding to and showing the lift coefficient of the wing of the airplane of Fig. 1, for the wing angles of attack up to the angle of stall, and illustrating the cooperation and relation between the wing lift coefficient and the function and operation of the airplane longitudinal control of the invention.

As an example of a possible manner of carrying out, and for the purpose of explaining my invention, I have illustrated more or less diagrammatically in Fig. 1 of the accompanying drawings, an airplane into which the invention is incorporated and embodied. It is to be clearly understood that the illustrated airplane is purely to typify generically and broadly the conventional and universally used types of airplanes, as well as any other type and design presenting the equivalent conditions or characteristics to which the broad principles of my invention are, or may be found to be, applicable.

The airplane of Fig. 1 embodies the usual major elements making up the same, including the body or fuselage 10; supporting wing or lift surface 11 (which may be of the monoplane type shown, or of the multiplane type, arranged and mounted in any desired manner); the power plant including motor M and propeller P; the landing gear including landing wheels 12 carried by any suitable shock absorbing and vertical play permitting means or members 14, and the tail wheel (or skid) 15; and the empennage E which includes the horizontal stabilizer 16 and the elevator or longitudinal control surface 17. In the conventional or any desired manner the elevator 17 is vertically swingable on a horizontal axis 18 which in the example hereof is fixed to or carried by the fuselage 10 and independently of stabilizer 16. The elevator 17 is actuated from the pilot's control cockpit in body 10 by the usual or any suitable control stick 19, referring to Figs. 3 and 4, through a suitable system of control cables or the like 20 operatively connecting stick 19 and elevator 17, as will be readily understood by those skilled in the art. The horizontal stabilizer here shown is of the adjustable type as indicated by dotted lines in Fig. 1, although a stabilizer of the non-adjustable, fixed type familiar in the art may be employed, as the invention is not concerned with the type, or even the presence, of a stabilizer.

The wing 11 in the airplane of Fig. 1, for purposes of explanation is assumed to have the characteristics and develop the indicated lift coefficients at the indicated angles of attack of the wing to generate the so-called "lift-curve" graphically presented in Fig. 5 of the accompanying drawings. This lift curve for the wing 11 indicates that the wing and airplane for which it provides the sustaining and lift surface, reaches a condition of maximum lift with the wing at an angle of attack of 13°, and that any increase in this angle brings the airplane into the range of stalled flight at which it is usually laterally unstable with very poor control, and from which the spin follows.

As well understood in the art, the longitudinal control and the angle of attack of the airplane are determined by the deflection given the elevator 17 by the pilot through the medium of his control stick 19. Upward deflection of elevator 17 depresses or lowers the tail and raises the nose of the airplane to increase the angle of attack of wing 11, while downward elevator deflection raises the tail and depresses the nose to decrease the wing angle of attack. Hence, in making a landing with the airplane shown, if, in the landing glide with power-off or throttled, the pilot in attempting to stretch his glide, or in his efforts to reduce speed to a minimum and make a very short landing to get onto a small field, actuates the longitudinal control to depress the tail of the airplane by upward deflection of elevator 17 to a point where the angle of attack exceeds 13° for wing 11, then a stall results with a possible spin and crash to follow.

Now, in accordance with the broad principles of my invention, the longitudinal control for the airplane (the term longitudinal control includes the adjustable stabilizer or its equivalent, the elevator or its equivalent, and the control mechanism for actuating the same) is so designed and arranged as to aerodynamically function and cooperate with the wing 11 and its characteristics in such a manner that the airplane cannot be stalled and spun without the use of power. This is accomplished by limiting the longitudinal control tending to depress the tail and raise the nose of the airplane and increase the angle of attack attainable with power-off and the airplane in a glide, to a point at which the angle of attack is slightly below that corresponding to the maximum lift coefficient or peak of the lift curve. For instance, with wing 11 of the airplane of the illustrated example, the limitation of the longitudinal control is such that the angle of attack attainable without power lies below the maximum lift coefficient shown by the lift curve of Fig. 5, or below the 13° angle of maximum lift for such wing.

The limitation of the longitudinal control tending to depress the tail and increase the angle of attack of wing 11, referring now to the specific example of Fig. 1 of the drawings, is carried out by positively limiting the upward deflection of the elevator 17, and the downward deflection of the leading edge of stabilizer by stop 16', to the point at which the airplane in a glide without power cannot be given an altitude to increase the angle of attack of wing 11 beyond the maximum lift angle of 13°, and preferably not higher or beyond an angle from 2° to 5° below the 13° maximum lift angle for the wing 11 (see Fig. 5). For instance, I happen to disclose in Fig. 1, an arrangement of the adjustable stabilizer 16 and elevator 17 such that, when the elevator reaches the predetermined maximum upward deflection point or angle, the leading edge thereof engages and abuts against the adjacent trailing edge of stabilizer 16 which forms and provides a positive limiting stop 21 for the elevator 17 at the desired angle of maximum upward elevator deflection, as clearly shown by full lines in Fig. 1 of the drawings.

A modified arrangement of stop for limiting the upward deflection of elevator 17 is disclosed in Fig. 2 of the drawings, in which the elevator 17 is provided with a forwardly and upwardly disposed or inclined arm 22, or plurality thereof, fixed to the elevator and so positioned with respect to stabilizer 16, as to engage the same when the elevator is swung to the predetermined angle of upward deflection and thereby positively prevent further upward deflection. Preferably, either stop arm 22 or the stabilizer 16 at the point of engagement with a stop arm is provided with an engaging member, block or surface 23, which if desired may be of shock absorbing or cushioning character.

Instead of providing the limiting engagement at and between the elevator and the stabilizer, or between the elevator and adjacent fixed structure as included within the invention, the limitation of upward elevator deflection can be obtained by restricting movement of other portions of the longitudinal control. For example, as shown in Fig. 3 of the drawings, the pilot's control stick 19 is limited in its backward, elevator raising movement by the stop 24 located at the desired point forwardly of the stick and for engagement below the axis 19' on which the stick is swung. In this manner the stop 24 by proper location with respect to the control stick will limit upward deflection of elevator 17 at the desired point to prevent the pilot from depressing the tail of the airplane sufficiently to attain an angle of attack for the wing above the angle of maximum lift or stall for such wing, as heretofore pointed out and explained.

In Fig. 4 of the drawings another location of a limiting stop 24' for the control stick 19 of the longitudinal control is shown, as positioned rearwardly of the control stick and above the axis 19' thereof, so that rearward elevator or upward deflection, moving or swinging of the control stick is positively stopped and limited at the required point by the control stick engaging against stop 24'.

The foregoing elevator upward deflection limiting arrangements are presented purely by way of example, as the invention contemplates and includes any desired arrangement or design within the broad scope thereof, by which the desired limitation with respect to the angles of attack of the airplane wing can be obtained for the upward deflection of the longitudinal control. Further, the more or less diagrammatic disclosures of the examples given of control limiting means include where desired or found expedient, adjustability for such means to vary the deflection angle to which the longitudinal control can be upwardly deflected.

It is further to be noted that the longitudinal control limitation can within the scope of my invention be obtained by reducing the size of the stabilizer and/or elevator, but such arrangement has the effect of reducing controllability and maneuverability within some desirable and essential range. Hence, the preferred arrangements of my invention provide the limitation of up travel or deflection of the elevator, which leaves the airplane with full longitudinal control available for most maneuvers necessary to ordinary flight. The sharpest turns can be made with the same radius within all practical limits, and without the danger of stalling.

An airplane embodying the basic and fundamental feature of the invention as above explained, say for example the airplane of Fig. 1 of the drawings, can be landed by merely shutting off or throttling down the motor M, and pulling control stick 19 full back until the elevator 17 is given its maximum deflection as determined by its limiting engagement with stabilizer 16 at 21. The airplane will then glide into the landing surface under full control and without possibility of stalling and spinning and settle onto the landing surface without the step of "leveling-off", as heretofore required with conventional types of airplanes. Where the stabilizer 16 is adjustable, it should for landings be preferably set or adjusted in the maximum tail heavy position for the shortest possible landings, although satisfactory landings in accordance with the invention can be made with the stabilizer in the opposite position.

Due to the fact that an airplane is landed in accordance with my invention, by gliding the same onto the landing surface with the full longitudinal control available, as limited with respect to the maximum angle of lift for the wing or wings of the airplane, tending to depress the tail in use throughout the entire landing operation, the landing shock will be greater than that encountered in the conventional normal landings with an airplane of the conventional types. The vertical velocities with the conventional airplane landings of say a bad "pancake" type, will have a maximum of approximately eight (8)

to ten (10) feet per second, which requires a landing gear vertical shock absorbing displacement of approximately six (6) to eight (8) inches. With the landings of my invention the vertical velocities will have a maximum of say approximately twelve (12) to twenty (20) feet per second, and hence a further feature of my invention resides in the provision of a landing gear having a vertical and shock absorbing displacement of approximately twelve (12) to eighteen (18) inches. At this point attention is directed to the fact that when reference is made to the "landing gear", the usual tail skid or wheel for the airplane is included, which of course must be given a corresponding increase in vertical shock absorbing displacement, as will be readily recognized.

In the airplane of Fig. 1 which exemplifies one expression of my invention, I have diagrammatically illustrated a landing gear which includes the brake equipped landing wheels 12 and the shock absorbing members of any of the widely used and well known types, and the tail wheel 15 mounted for vertical displacement on the usual or other suitable vertical shock absorbing displacement permitting means. The landing wheels 12 are permitted a long travel and vertical shock absorbing displacement by members 14, as diagrammatically indicated in dotted outline, and tail wheel 15 is similarly arranged as indicated in dotted outline. The vertical travel and shock absorbing is sufficient to care for and absorb the landing shock of the vertical velocities hereinbefore indicated.

The term "wing" as used throughout this description and as employed in the appended claims, includes wings of the various so-called "high lift" types, such for example as the well-known Handley Page so-called "slotted" wings. Such wings merely increase the angle of maximum lift of a wing with reduction in landing speeds, and the invention hereof is equally applicable thereto, and when employed therewith will produce the same advantageous results as with conventionel wings but with the added advantage of slower landing speeds and increased angle of descent possible.

The limitation by the invention of the longitudinal control of the airplane tending to depress the tail and increase the angle of attack, to a point where the maximum angle of attack attainable lies below the angle of maximum lift for the particular wing involved, as hereinbefore explained, is primarily for the landing maneuver and applies to the airplane in a glide without power, or the power substantially throttled. The conventional types of airplane balances at a much higher angle of attack, approximately 10° higher, with power full on than with power off, for the same stabilizer and elevator settings, so that an airplane can attain a much higher angle of attack with power on than with it off. It is, therefore, not usually possible to limit the longitudinal control to a point where a stall and spin cannot be made with power and still retain sufficient control for ordinary flying.

As a further feature of my invention, however, the possibility of spin with either power on or power off is eliminated. This I accomplish by balancing the airplane at approximately the same angle of attack both with power on and power off, while still retaining sufficient longitudinal control, by either raising the thrust line the required amount, or by taking the longitudinal control surfaces and mounting them in position out of or removed from the propeller slip stream.

By the method of landing or maneuvering an airplane presented by the invention, the possibility of spins with power-off or throttled is eliminated, particularly in the landing glide, while that heretofore essential step in the conventional landing operation of "leveling-off", with the high degree of pilot skill required, is done away with. Landings can be made over obstructions in approximately half the distance required with the present conventional airplanes, all while materially reducing the skill and training necessary to make safe, satisfactory landings. The arrangements and means for carrying out the invention are extremely simple, inexpensive and readily installed on or incorporated in the conventional types of airplanes now in universal use, without materially adding to the weight or otherwise materially impairing the performance of such types, while removing the landing hazards therefrom and opening up for practical use large numbers of small landing areas practically impossible heretofore for landing purposes.

While the land type of landing gear embodying and meeting the requirements of my invention, is shown in the selected example hereof, it is to be understood that the invention includes landing gear of the water types employing pontoons, floats and such like, with the required shock absorbing and vertical movement permitting supports such as indicated by members 14 in the landing gear as disclosed in Fig. 1 of the drawings; such water landing gear being the equivalent of the gear shown and described.

It is clearly evident that various changes, modifications, variations, substitutions and additions might be resorted to without departing from the spirit and scope of my invention, and hence I do not desire to limit myself in all respects to the exact and specific disclosures hereof.

Desiring to protect my invention in the broadest manner legally possible, what I claim, is:

1. In an airplane, a wing, a power plant, a shock absorbing landing gear, and a longitudinal control including a vertically swingable control surface sufficient for ordinary maneuvers in flight; and means positively limiting maximum upward swinging and airplane tail depressing position of said longitudinal control surface to a point at which, in a glide and with power off the airplane is placed in tail depressed attitude with the maximum wing angle of attack attainable slightly less than the angle of stall for such wing.

2. In an airplane, a wing, a power plant, a landing gear, a longitudinal control sufficient for ordinary maneuvers in flight, and means positively limiting maximum tail depressing position of said longitudinal control to a fixed point under all conditions of flight with either power on or power off, the maximum tail depressing position of the longitudinal control limited by said means with the airplane in a glide and the power off to place the airplane in tail depressed attitude with the maximum wing angle of attack attainable less than the stall angle for such wing.

3. In an airplane, a wing, a power plant, a landing gear, a longitudinal control including a vertically deflectable control surface for raising and depressing the tail of the airplane to decrease and increase the angle of attack of the wing, and fixed stop means cooperating with the longitudinal control to positively limit the upward deflection of said control surface to a point at which the maximum angle of attack attainable for the wing when the airplane is in a power off glide is less than the angle of stall for the wing.

4. In an airplane, a wing, a power plant, a landing gear, a longitudinal control, and means positively limiting maximum tail depressing position of the longitudinal control to a point to place the airplane in tail depressed landing attitude when the airplane is in a steady glide without power with the maximum angle of attack attainable for the wing less than the stall angle for such wing, said landing gear including shock absorbing means providing vertical displacement for the gear to absorb the vertical velocities of landing with the airplane in maximum tail depressed attitude.

5. In an airplane including a fuselage, a wing, a power plant, and a longitudinal control for raising and depressing the airplane tail to decrease or increase the angle of attack of the wing; said airplane balancing at approximately the same angle of attack with the power off or the power on and the longitudinal control in maximum tail depressing angle of attack increasing position, and fixed stop means positively limiting the maximum tail depressing position of the longitudinal control to a point at which the maximum angle of attack attainable for the wing is less than the stall angle for such wing in steady flight with either power on or power off, the maximum tail depressing position of the longitudinal control with power off placing the airplane in tail depressed landing attitude with the wing angle of attack less than the stall angle.

Signed at Hampton, county of Elizabeth City, State of Virginia, this 7 day of February, 1931.

FRED E. WEICK.